United States Patent Office.

SYLVESTER P. WHEELER, OF BRIDGEPORT, CONNECTICUT, ASSIGNOR TO HIMSELF AND SAMUEL B. HENRY, OF SAME PLACE.

Letters Patent No. 101,552, dated April 5, 1870.

IMPROVEMENT IN THE MANUFACTURE OF ARTICLES OF COMPRESSED WOOD.

The Schedule referred to in these Letters Patent and making part of the same.

I, SYLVESTER P. WHEELER, of Bridgeport, county of Fairfield, State of Connecticut, have invented an Improvement in the Manufacture of articles of Compressed Wood, of which the following is a specification.

Nature and Object of the Invention.

My invention relates to an improvement in the manufacture for which Letters Patent of the United States were granted to SAMUEL B. HENRY on the 21st day of January, 1868, the manufacture of the said HENRY consisting of embossed imitations of wood carvings, in which the compressed fibers are fixed with a solution of rubber, or its equivalent; and My invention consists of embossed wood, so prepared and deodorized as described hereafter.

General Description.

The wooden articles, to improvements on which my invention relates, consist of ornaments embossed by pressure with dies against the end grain of the wood, so as to represent imitations of ornamental carvings.

In the aforesaid patent of SAMUEL B. HENRY is described the treatment of these articles of compressed wood with a solution of India rubber for the purpose of fixing the fibers, and in an improvement of my own for effecting the same purpose, and for which I have applied for Letters Patent, I prepare the embossed articles with a solution of rubber, or its equivalent, and then subject them to the action of chloride of sulphur. The articles, when thus acted on, are discolored and emit an offensive odor.

In order to prevent this, I subject them to the action of ammoniacal gas under pressure, as described in a separate application which I have made for a patent. This treatment not only deodorizes the articles, but has the effect of restoring to them the natural color of the wood of which they are composed.

In some cases I pass the ammoniacal gas through a preparation of essential oil, so that, while the gas is acting with deodorizing effect on the wood, the pores of the latter are impregnated with the essential oil taken up by the gas, and an agreeable odor is thus imparted to the articles.

Claim.

As a new manufacture, embossed imitations of carved wood, deodorized, after being so treated as to fix the fibers, as herein set forth.

In testimony whereof I have signed my name to this specification in the presence of two subscribing witnesses.

SYLVESTER P. WHEELER.

Witnesses:
H. HOWSON,
E. H. BAILEY.